United States Patent
Johnson et al.

(10) Patent No.: US 6,175,305 B1
(45) Date of Patent: Jan. 16, 2001

(54) STOPLAMP MODULATOR MODULE ELECTRONIC DEVICE

(75) Inventors: Louis E. Johnson, 11780 W. 12th Ave., Golden, CO (US) 80401; Robert C. Minnick, Pueblo, CO (US)

(73) Assignee: Louis E. Johnson, Golden, CO (US)

( * ) Notice: Under 35 U.S.C. 154(b), the term of this patent shall be extended for 0 days.

(21) Appl. No.: 08/594,343

(22) Filed: Jan. 30, 1996

Related U.S. Application Data

(63) Continuation-in-part of application No. 08/359,405, filed on Dec. 20, 1994, now abandoned.

(51) Int. Cl.[7] ...................................................... B60Q 1/44
(52) U.S. Cl. ......................... 340/479; 340/463; 340/466; 340/467
(58) Field of Search .................... 340/479, 466, 340/463, 464, 467, 441

(56) References Cited

U.S. PATENT DOCUMENTS

| | | | |
|---|---|---|---|
| 3,691,525 | * 9/1972 | McClellan, Sr. et al. | 340/466 |
| 4,556,862 | * 12/1985 | Meinerahagen | 340/466 |
| 4,800,377 | * 1/1989 | Slade | 340/466 |
| 4,894,641 | * 1/1990 | Yang | 340/466 |
| 5,148,147 | * 9/1992 | Kobres | 340/466 |

* cited by examiner

Primary Examiner—Donnie L. Crosland
(74) Attorney, Agent, or Firm—Edwin H. Crabtree; Ramon L. Pizavvo; Donald W. Margolis

(57) ABSTRACT

A stoplamp modulator module electronic device for use in a currently produced vehicle to provide an improved rear signal light to reduce rear-end collisions. The electronic device is adapted for attachment to a standard center high-mount stoplamp installed in the rear of the vehicle. The device is designed specifically to visually alert, using light signals, a trailing vehicle that the vehicle with electronic device is traveling below a predetermined threshold velocity or has stopped. The device receives power from the vehicle's battery voltage and is connected to a chassis ground. Also, the device receives inputs from the brake-light switch and the vehicle speed pulser. The electronic device includes appropriate interfaces for receiving pulse inputs giving an indication of the vehicle's velocity. Also, the device includes counters and logic to determine if the vehicle is at a high or low velocity and power circuits to actuate one or more lamps in the stoplamp when the vehicle is below the threshold velocity. The lamp or lamps when below the threshold velocity are energized to display designated flash rate patterns and intensities to alert the trailing vehicle. Further, the electronic device includes circuitry and logic to power and modulate a moving light display having a plurality of lamps which is adapted for connection to the stoplamp. The moving light display circuitry can be programmed to produce a variety of patterns to supplement the lamps of the stoplamp when the vehicle is traveling above a certain velocity with the brake applied.

18 Claims, 3 Drawing Sheets

| BRAKE | VELOCITY | LIGHTS | MLD |
|---|---|---|---|
| NOT APPLIED | LOW | DIM/WARBLE PATTERN | OFF |
| APPLIED | LOW | BRIGHT PATTERN | OFF |
| NOT APPLIED | HIGH | OFF | OFF |
| APPLIED | HIGH | BRIGHT ON | ON |

FIG. 3

STOPLAMP MODULATOR MODULE ELECTRONIC DEVICE

This application is a continuation-in-part application of patent application Ser. No. 08/359,405, filed Dec. 20, 1994 by the subject inventor and having a title of "VEHICLE BRAKE LIGHT SIGNAL MODIFIER SYSTEM" now abandoned.

BACKGROUND OF THE INVENTION (a) Field of the Invention

This invention relates to vehicle brake light devices and systems and more particularly, but not by way of limitation, to a stoplamp modulator module electronic device adapted for attachment to a center high-mount stoplamp in the rear of new vehicles or as a retrofit system and providing different types of early warning alert signals to trailing vehicles. Also, while not discussed herein, the invention can be used equally well with vehicle stoplamps other than the center high-mount stoplamp.

There are over 123 million automobiles on the roads of the United States. Additionally there are 58 million trucks, busses, commercial vans, school vehicles, etc., using these same highways. Without exception, every driver of these vehicles at one time or another has experienced the terror of coming up too quickly on a vehicle which was moving at a slower speed or even at a dead stop on the road ahead. With so many vehicles on the road, and more being added every day, this dangerous occurrence is becoming more and more common.

The result of this driving hazard phenomenon is 3.5 million rear-end crashes annually. Most people are unaware of their precarious situation when they encounter any unexpected slowing of traffic. If in this situation, one person misjudges how soon and how fast to brake, the result is one car after another "stopping short." The outcome is often a jarring to reality as the screeching of tires is echoed. Many times these encounters result at best in crumpled metal, and at worst great injury or loss of life. According to government statistics, rear-end crashes constitute 23% of all police reported crashes. Three and one half million rear-end crashes occur annually, resulting in thousands of deaths and hundreds of thousands of injuries. Medical and material losses are in the tens of billions of dollars. Traffic delay (144 million vehicle hours lost annually) and strain on municipal resources are among the numerous negative side effects. Statistics also show that 85% of rear-end crashes occur when the lead vehicle is stopped or traveling slowly (under 25 MPH) and result largely from driver inattention and other forms of delayed recognition (i.e., driver does not properly perceive, comprehend, and/or react to the vehicle in his or her forward travel path).

A significant factor contributing to this phenomenon is that brake lights as they exist today provide only general information about braking, i.e., the brake has been applied. No distinction is made between brakes applied at 50 MPH and brakes applied at 15 MPH. The primary purpose of brake lights is the prevention of rear-end crashes. However, the only information that is known for sure is that the brake light switch has been closed, which could mean any degree of braking at any speed. Even with this obscure information, drivers gain a limited understanding of the intentions of drivers ahead, giving them, to a small degree, confidence and driving efficiency.

Many studies have been performed over the past 25 years related to the circumstances and causes of rear-end crashes, with the intention of finding ways to improve rear signaling devices.

RESEARCH REFERENCES

Government and university research dating back to 1970 reveals that rear-end crashes are a significant problem on America's roadways, directly affecting over 7 million drivers every year. Rear-end crashes are caused for the most part, by driver inattention and delayed recognition. According to U.S. Government research as outlined in DOT HS 807 994, Rear-End Crashes: Problem Size Assessment and Statistical Description 1993, there are in excess of 3.5 million rear-end crashes annually (pg ES-2, 2–4) resulting in 2,084 fatalities and 844,000 injuries (pg ES-1). Rear-end crashes cause 144 million vehicle-hours of delay annually. This is about one-third of all crash caused delay (pg ES-2). In their statistical description, crashes are categorized into two subtypes: lead vehicle stationary (LVS) and lead vehicle moving (LVM).

LVS crashes constitute the larger overall problem in terms of crashes, injuries, and fatalities. There are more than twice as many LVS crashes as LVM crashes (pg ES-2). Statistical data compiled portray rear-end crashes as resulting largely from driver inattention and other forms of delayed recognition (i.e., driver does not properly perceive, comprehend, and/or react to vehicle in his or her forward travel path) (pg ES-3). Ninety seven percent of rear-end crashes involve a struck passenger vehicle (pg 2–4). In LVS crashes, the median speed of the striking vehicle is 22 mph. For the struck vehicle in LVM crashes, the most common vehicle precrash maneuver is slowing or stopping (56%), and for LVS crashes, the most common precrash maneuver is "stopped" (98%) (pg 4-3). One caveat regarding the LVS versus LVM dichotomy is that some LVS crashes may involve a lead vehicle that has braked to a stop immediately (less than one second) prior to being struck (pg 4—4).

In DOT HS 805 061, Field Test Evaluation of Rear Lighting Deceleration Signals: I-Analytical and Experimental Studies conducted by R. G. Mortimer at the University of Illinois in 1979, 26 configurations of experimental deceleration signals were developed to determine the effectiveness of such signals. Of these, 5 signals consisting of different combinations of light characteristics such as flash rate coding and intensity coding reflecting various magnitudes of deceleration, displayed by a single auxiliary light located at the center line on the rear of the vehicle were selected for road testing. In analyzing the results of these tests, it was concluded that those systems which employed large changes in intensity provided effective information of deceleration levels, and when these were augmented by flash rate coding, in addition to intensity coding they were considered very effective (pg 40). It was also concluded that more than two levels of deceleration should not be coded into a deceleration signal. There was no added benefit of a continuous coding display either using intensity coding or flash rate coding or a combination of these (pg 40). The highest rated single lamp systems used a combination of flash rate coding and intensity coding or flash rate coding alone. Flash coding the conventional brake lamps somewhat increased their effectiveness in presenting deceleration information over systems not coding deceleration, but they were rated low on attention-getting and distinguishability from other signals (pg 43).

In R. G. Mortimer's final report DOT HS 806-125 dated 1981 describing the results of the field test phase of his research involving 600 taxicabs which traveled 40.7 million miles during the study, he states, "when all types of crashes in which cabs were rear-ended were included, the cabs were stopped in traffic 51%, parked or temporarily stopped in traffic in 20%, stopping in 15%, and starting or moving in traffic in 14%, just before being struck, suggesting the need for a signal that indicates that a vehicle is stopped or moving very slowly" (pg ii). In conclusion, Dr. Mortimer states, "In general, it appears that improvements in coding of the vehicle rear lighting and signaling system (Mortimer, 1970) can be an effective means of reducing rear-end crashes in a relatively inexpensive way. However, the present study, taken in conjunction with other findings (e.g., Perchonok, 1972; Mortimer, 1971; CHP, 1973; Malone et al., 1978; Reilly et al., 1980) also indicates that a signal specifically devoted to informing drivers that a vehicle ahead is stopped in traffic or moving very slowly may be useful in reducing rear-end crashes, since it appears that many rear-end crashes occur in that situation" (pg 22).

A more recent SAE Technical Paper on the subject, 851240 entitled The Technical Basis for the Center High Mount Stoplamp (1985) referring to this same taxicab fleet study, reiterates Dr. Mortimer's conclusions stating "since most of the struck vehicles were stopped, attention should probably be directed towards the development of a specialized signal to indicate that a vehicle is stopped or moving very slowly" (pg 5).

(b) Discussion of Prior Art

Heretofore there have been a variety of different types of brake light systems designed to flash during deceleration. U.S. Pat. No. 4,800,377 to Slade describes the use of rear warning lights on a vehicle. The warning lights begin flashing when energized below a certain velocity threshold. At low speeds the lights can be set to cease flashing and have a steady glow.

In U.S. Pat. No. 4,651,129 to Wood et al. and U.S. Pat. No. 3,846,749 to Curry electrical circuitry is described to include flashing rear brake lights reflecting a rate equal to deceleration of a vehicle. U.S. Pat. No. 5,148,147 to Kobres teaches the use of a vehicle deceleration system wherein the speed of the vehicle is deduced to create an instant flashing of the brake lights. The system includes both amber and red lens indicators.

Also, U.S. Pat. Nos. 4,235,316 to Blomberg and 3,519,987 to Jania disclose the use of a rotational shaft or wheels of a vehicle to detect and determine the degree of braking and display flashing brake lights accordingly.

None of the above mentioned patents individually or in combination disclose the unique features and advantages of the subject stoplamp modulator module electronic device for providing continuous monitoring of the speed of the vehicle and providing early warning light signals to trailing vehicles when the vehicle is below a predetermined threshold speed or stopped.

SUMMARY OF THE INVENTION

A primary object of the subject invention is to provide a stoplamp modulator module electronic device for use in a currently produced vehicle to reduce rear-end collisions. The electronic device is adapted for attachment to a standard center high-mount stoplamp installed in the rear of the vehicle.

Another object of the invention is to provide a device designed specifically to visually alert, using light signals, a trailing vehicle that the vehicle with the invention is traveling below a certain predetermined threshold velocity or has stopped.

Still another object of the present invention is to provide a unique stoplamp modulator module electronic device that can be easily installed during the manufacture of a new vehicle or retrofited in a used vehicle. The device is easily adapted to be installed in standard automobiles and vans, different sizes and types of trucks, buses and other vehicles.

Yet another object of the invention is to provide an electronic device that will give an early warning to trailing vehicles by different types of modulated light signals. The system is designed with safety in mind and to aid in reducing rear-end collisions.

The subject electronic device receives power from the vehicle's battery voltage and is connected to a chassis ground. Also, the device receives inputs from the load side of the brakelight switch and a vehicle speed pulser. The electronic device includes appropriate interfaces for receiving pulse inputs giving an indication of the vehicle's velocity. Also, the device includes counters and logic to determine if the vehicle is at a high or low velocity and power circuits to actuate one or more lamps in the stoplamp when the vehicle is below the threshold velocity. The lamp or lamps when below a threshold velocity are energized by a complex period waveform to display designated flash rate patterns and intensities to alert the trailing vehicle. Further, the electronic device includes circuitry and logic to power and modulate a moving light display having a plurality of lamps which is adapted for connection to the stoplamp. The moving light display circuitry can be programmed to produce a variety of patterns to supplement the lamps of the stoplamp when the vehicle is traveling above a certain speed with the brake applied.

These and other objects of the present invention will become apparent to those skilled in the art from the following detailed description, showing the contemplated novel construction, combination, and elements as herein described, and more particularly defined by the appended claims, it being understood that changes in the precise embodiments to the herein disclosed invention are meant to be included as coming within the scope of the claims, except insofar as they may be precluded by the prior art.

BRIEF DESCRIPTION OF THE DRAWINGS

The accompanying drawings illustrate complete preferred embodiments of the present invention according to the best modes presently devised for the practical application of the principles thereof, and in which:

FIG. 3 illustrates various light patterns when the brakes of the vehicle are applied and are not applied and the velocity of the vehicle.

DETAILED DESCRIPTION OF THE PREFERRED EMBODIMENT

Figure 1:
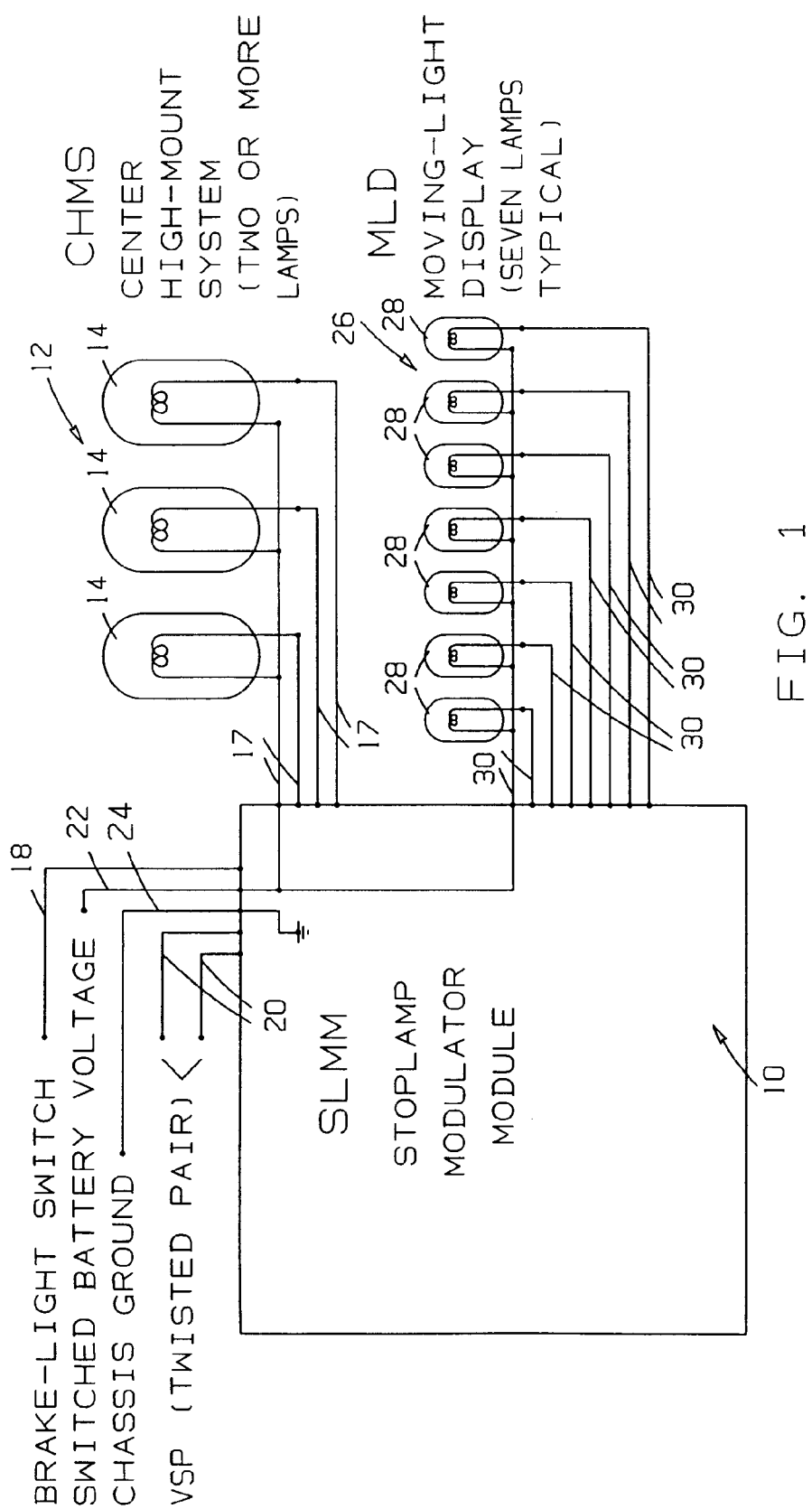
FIG. 1 illustrate a block diagram of the stoplamp modulator module electronic device connected to the center high-mount system of the vehicle and including a moving light display.

In FIG. 1, the subject invention, called a Stoplamp Modulator Module electronic device, is given general reference numeral 10. The electronic device 10 is intended to be an improvement to a Center High-Mount Stoplamp that is available on most currently produced vehicles. The Center High-Mount Stoplamp is given general reference numeral 12. The stoplamp 12, which is abbreviated CHMS in the drawings for convenience, usually consist of one or more lamps 14 in a housing that is mounted centrally and higher than the usual rear brake lamps of the vehicle and connected to the device 10 by electrical leads 17. The lamps 14 are arranged to light whenever the brake pedal is pressed. Several government and private studies, some of which were cited earlier, have shown that the presence of a stoplamp 12 improves the vehicle safety. These same studies as well as others have proved that the vehicle safety can be further enhanced if additional features are included in the stoplamp 12, and in particular if the stoplamp includes some indication that the vehicle is stopped or moving very slowly. The subject invention addresses these added enhanced features.

In reference to FIG. 1, the electronic device 10 receives inputs from a brake-light switch via lead 18 and a Vehicle Speed Pulser (abbreviated VSP) via leads 20. The device 10 receives power from a switched voltage from the vehicle's battery via lead 22 and is also connected to a chassis ground via lead 24. Within the electronic device 10 there are appropriate interface, counters, logic and power circuits to actuate one or more lamps 14 in the stoplamp 12. Also, there are circuits to actuate an attachment or enhancement of the stoplamp 12 which is called the Moving-Light Display, or MLD for short. The Moving-Light Display is given general reference numeral 26 and includes lamps 28. The lamps 28 are connected to the device 10 via leads 30. The purpose of the moving light display is to enhance the effectiveness of the signals generated by the SLMM. The MLD when used at high velocity with brake applied informs drivers that a vehicle CHMS is equipped with the SLMM or not and likewise, which CHMS's can be relied upon to give stop or low velocity indications, and which CHMS's can not.

Figure 2:
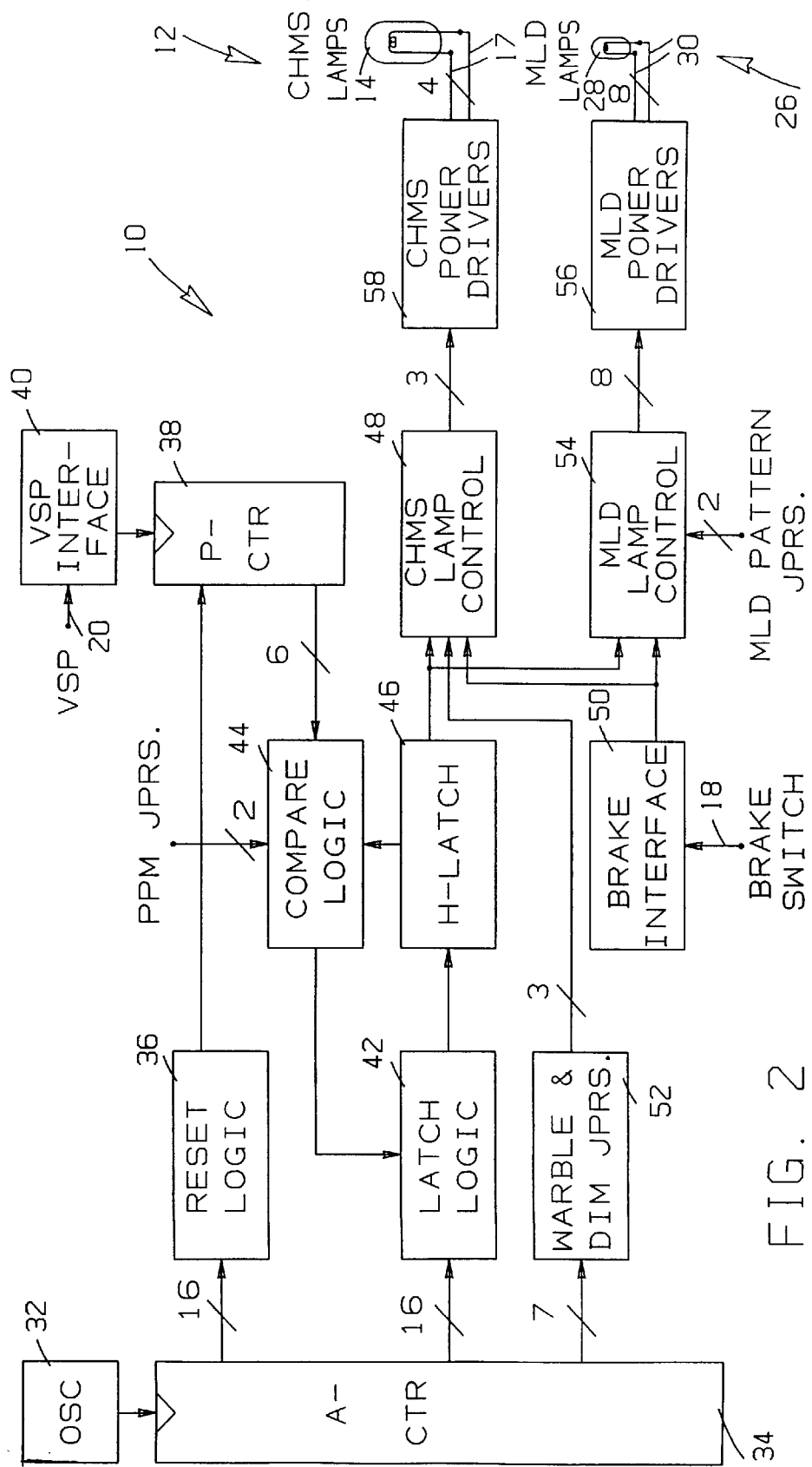
FIG. 2 is a block diagram of the counters, logic, interface, jumper pins and power drivers making up the subject electronic device.

In FIG. 2, the subject invention is shown in a block-diagram form. Timing for all operations is derived from a crystal oscillator, marked OSC, and having reference numeral 32. The oscillator 32 is chosen to run at 32768 Hz and it is based on a quartz crystal such as those often used in electronic watches. Other frequencies could be chosen and other types of oscillators could be used without changing the intent of the invention. The oscillator 32 is used as a clock to run a first synchronous 16-stage counter, marked A-CTR, and having reference numeral 34. Each stage of the first counter 34 divides the frequency of the previous stage by two; therefore, the first stage in the first counter 34 produces an oscillation of half the crystal oscillator frequency, the second stage produces an oscillation of one-quarter of the crystal oscillator frequency, and so on. By simple arithmetic it is seen that the first counter 34 produces frequencies of 16384 Hz, 8096 Hz, and so on down to one-half Hz. The first counter 34 also could be created from two or more shorter and synchronized counters in order to accommodate the limitations of the particular logical devices that are chosen for the implementation of the electronic device 10. Furthermore, one or more asynchronous or other types of counters could be used. By choosing a different oscillator frequency, the number of stages in the first counter 34 can be changed accordingly. All of these variations and substitutions could be made without changing the purpose and intent of the invention.

In FIG. 2 there is a block called RESET LOGIC having numeral 36. The reset logic 36 creates a single short reset pulse every second. The reset pulse is sent to a second counter 38 marked as P-CTR. The second counter 38 is a six-stage synchronous counter that receives its count signal from the Vehicle Speed Pulser, or VSP, via a block marked VSP INTERFACE having a reference numeral 40. The block 40 contains appropriate circuits to match the signal levels of the vehicle VSP pulses to the levels that are expected by the logic of the device 10. The second counter 38 counts the number of VSP pulses that have been received since the last reset pulse from reset logic 36. Furthermore, if the second counter 38 receives sixty four or more pulses from the VSP, the counter does not change in response to further VSP pulses. That is, the second counter 38 is not allowed to count from the state of all ones to the state of all zeroes. The second counter 38 may contain fewer or more stages or it could be an asynchronous or other type of counter without changing the intent of the invention. Anyone skilled in the art who has a knowledge of the signal levels of the VSP can design the VSP interface 40. Therefore the block 40 will not be discussed further.

In FIG. 2, a block 42, marked LATCH LOGIC, creates a short pulse called a latch pulse very shortly before the reset pulse from the reset logic 36 that was described above. The purpose of the latch pulse is to establish the time at which a new determination is to be taken of the vehicle's velocity. This sample is taken once per second. This one-second period is called a "sample period" for convenience. The sixteen inputs from the first counter 34 that connect to the LATCH LOGIC block 42 determine when the latch pulse occurs, while an input from a block 44, marked COMPARE LOGIC, determines whether the value to be latched is a zero or a one. The single output of the LATCH LOGIC block 42 accordingly latches a one-bit latch block 46, marked H-LATCH. The new value is held unchanged for substantially the full duration of the next sample period.

The COMPARE LOGIC block 44 receives six inputs from the second counter 38. These inputs give an indication of the vehicle's velocity during a current one-second sample period. Because different VSPs produce a different number of pulses per mile of travel, the COMPARE LOGIC block 44 has two additional inputs from jumper pins. These jumper pins specify one of four possible pulses-per-mile values, abbreviated PPM JPRS in the drawings. These jumper pins could be switches or other configuration means without changing the intent of the invention. Similarly, a different number of jumper pins could be provided in order to accommodate fewer or more types of VSPs; that is, VSPs that have differing PPM values for different types and styles of vehicles. It can be appreciated that when the subject invention is installed on a single manufacturer's vehicle, a single value of VSP may be received by the VSP Interface 40 and added jumper pins will not be necessary.

A threshold between high and low velocity has been chosen to be at approximately 22 mph. However, another value could be chosen without changing the intent of the invention. If the vehicle is travelling at a velocity close to this transition value, minor variations in speed might cause excessive transitions, or chatter, between the high and low velocity indications in the H-LATCH 46. Therefore, in the subject electronic device 10, two transition velocities are chosen: in the preferred embodiment, velocities of 21.6 mph and 25.2 mph are used. If during the previous one-second sample period the velocity, as stored in the H-LATCH 46, is 0 (or false or low velocity), then in order to change the H-LATCH 46 to store a high-velocity indication during the next sample period it is required that the velocity exceed the larger threshold value. Similarly, if the previous sample was a high velocity then the next sample must be lower than the low threshold value.

On FIG. 2, it is seen that the block 44 marked COMPARE LOGIC receives an input from the H-LATCH 46 so that this logic can determine which threshold to use. This process adds hysteresis and avoids the chatter that might otherwise be present. The particular pair of threshold values can be changed without changing the intent of the invention. In the preferred embodiment of the invention, if the H-LATCH 46 contains a 1 (or true or high) then the vehicle is interpreted to be travelling at a high velocity, while if it contains a zero the interpretation is that it is travelling at a low velocity. These interpretations could be interchanged with appropriate changes in the logic. Such changes would not change the intent of the invention.

In FIG. 2, a block 48 marked CHMS LAMP CONTROL is the logic that controls the one, two, three or more CHMS lamps. This block 48 receives inputs from three sources: the H-LATCH 46, a block 50 marked BRAKE INTERFACE and a block 52 marked WARBLE & DIM JPRS. The H-LATCH input determines whether the vehicle is travelling at a velocity that is interpreted as being high or low. The brake input to the CHMS LAMP CONTROL 48 comes from the vehicle's brake switch through the BRAKE INTERFACE block 50. This brake interface consists of appropriate electronic circuits to match the voltage and current levels at the brake switch to those expected in the electronic circuits of the device 10. Three inputs to the CHMS LAMP CONTROL block 48 come from the block 52 marked WARBLE & DIM JUMPERS. This latter block 52 consists of a sufficient number of jumper pins or switches or other configuration means to allow any of the seven inputs to be connected to any of the three outputs. These three outputs are logically combined in the subject electronic device 10 to cause either a dimming or other modulation in the outputs. It can be appreciated that when the subject invention is installed on a single manufacturer's vehicle, all modulation may be programmed into the SLMM 10 and jumper pins will not be necessary. Because anyone skilled in the art who has a knowledge of the signal levels of the brake switch can design the brake interface, this block 50 in FIG. 2 will not be discussed further.

If it is desired under certain circumstances to dim one or more of the CHMS lamps 14, then the three wires that connect the WARBLE & DIM JPRS. block 52 to the CHMS LAMP CONTROL block 48 are arranged to be three high-frequency stages of the first counter 34. These oscillations are logically combined to form a complex periodic waveform in such a way that over a one-second sample period, the output that is to be dimmed is switched on and off numerous times with the ratio of the "on"-time to the "off"-time set to the desired dimming value. By choosing three input wires this logical combination can be made to set the dimming to ⅛ or ⅖, or and so on up to ⅞ of the full value.

In a preferred embodiment the dimming, flickering, warbling or other modulation is performed by making appropriate logical combinations of selected stages of the A-CTR 34 to create a complex periodic waveform as mentioned above. Specifically, in the preferred embodiment, it is desired that one of the dimming values be ⅝ths of the maximum value and furthermore that this dimming be perceived as steady and not as flickering. In order to accomplish this, three high-frequency outputs of the counter 34 are combined logically such that whenever all three outputs are "off" or the first is "on" and the other two are "off" or the first is "on" and other two are "off" or the second is "on" and the other two are "off", then the logic block 48 sends appropriate logic signals to the CHMS POWER DRIVERS 58 to cause the CHMS LAMPS 14 to be "off". In all other cases of these three inputs to logic block 48 the lamps 14 are caused to be "on". Because there are exactly eight on-off combinations of these three inputs from counter 34, this logical arrangement causes the lamps 14 to be "on" for an average of ⅝ths of the time. Also because the three inputs from the counter 34 are changing at a rapid rate, the eye perceives no flicker in the lamps 14.

Similarly, in this preferred embodiment it is desired that for one setting of the jumpers 52 the lamps 14 appear to be flickering. For this case one or more of the counter outputs 34 are chosen to be low-frequency values. The logic block 48 in this case combines the three outputs of the jumpers 52 in the same manner that was just described. Because of the chosen inputs from the counter 34, the result is that the lamps 14 flicker.

One skilled in the art will recognize that by performing similar logical combinations in the logic block 48 on differently selected outputs of the counter 34 a wide variety of dimming, flickering, warbling or other modulation or variability of the lamps 14 may be accomplished. The particular choices that are made in the preferred embodiment are not intended to be limiting.

In the preferred embodiment of the invention three of the first counter 34 stages are used by the CHMS LAMP CONTROL block 48. It is possible to use fewer stages with the result of simpler dimming or warble logic and a coarser control. Similarly, a larger number of stages can be used with the result of more complex logic and finer control. Such changes do not change the intent of the invention. Similarly, the WARBLE & DIM JPRS. block 52 receives seven inputs from the first counter 34. This number can be changed without changing the intent of the invention. Again these variables may be programmed for specific manufacturers eliminating the jumper pins.

In an added embodiment of the subject electronic device 10, a block 54 marked MLD LAMP CONTROL receives inputs from the H-LATCH 46 and the BRAKE INTERFACE block 50 as well two jumpers marked MLD PATTERN JPRS in the drawings. These jumpers or switches or other configuration means control the repetitive pattern over a period of time with which the MLD lamps 28 are on and off. In the preferred embodiment of the invention two such jumpers are provided in order to allow the selection of one of four patterns; however, without changing the intent of the invention fewer or more jumpers or other configurations can be used. Also without changing the intent of the invention, the stoplamp 12 can be operated without the added light display 26 by leaving a block 56 marked MLD POWER DRIVERS unconnected.

A block 58 marked CHMS POWER DRIVERS and the MLD POWER DRIVERS block 56 have the function of converting the logic levels of the electronic device 10 to the power levels required by the respective lamps 14 and 28. Because anyone skilled in the art who has a knowledge of signal levels required by the CHMS lamps 14 and the MLD lamps 28 can design the CHMS POWER DRIVERS block 58 and the MLD POWER DRIVERS block 56, these blocks will not be discussed further.

If it is desired to operate the subject electronic device 10 with only two CHMS lamps 14, then the power driver for the center lamp can be left unused. If, on the other hand, it is desired to operate with four lamps 14, then the center power driver can be used to actuate the two center lamps. Similar connections can be used for a larger number of CHMS lamps 14 without changing the intent of the invention. If it is desired to operate the subject electronic device 10 with only one CHMS lamp 14 then two of the three power drivers 58 may be omitted.

Referring back to the CHMS LAMP CONTROL block 48, it is possible to establish various lighting patterns of the lamps 14. As was explained above, this block 48 receives from the BRAKE INTERFACE block 50 a logical signal that indicates whether the brake is applied or not, from the H-LATCH block 46 a logical signal that indicates whether the vehicle is travelling at high or low velocity, and from the WARBLE & DIM JPRS. block 52 the signals needed selectively to dim or create a warble in the outputs.

In a preferred embodiment of the invention, and based on both government and private research, some of which was cited earlier, the electronic device 10 takes the actions shown in FIG. 3. In reference to the first row of FIG. 3, it is seen that if the brake is not applied and at the same time it has been determined by the device 10 that the velocity is low, then the lamps 14 of the stoplamp 12 are either dimly lighted or are warbled, and furthermore in this case they are actuated with a particular on-off pattern. The pattern that is chosen in the preferred embodiment is for one-half second to have one outside lamp "off" and the other two lamps "on", then for the next one-quarter second to have all lamps "on", then for the next one-half second to have the opposite outside lamp "off" and the other two lamps "on". Finally, for the next three-quarters of a second all lamps are "on". In the preferred embodiment of a single-bulb CHMS 12, any of the lamp drivers 58 may be used.

The second row of FIG. 3 shows that if the brake is applied and the velocity of the vehicle is low, then the three lamps are lighted with the same pattern as was just described; however, in this case the lamps are not dimmed or warbled.

The third row of FIG. 3 indicates that if the brake is not applied and the vehicle is in the high velocity region then the stoplight lamps are all off.

The fourth row of FIG. 3 shows that if the brake is applied and the velocity is high then all three lamps are lighted with no dimming, warble or pattern.

FIG. 3 also shows the state of the MLD lamps 28 under the four conditions depicted by the four rows. It is seen in this figure that the MLD lamps 28 are lighted with the pattern specified by the MLD PATTERN JPRS. or other configuration means only if the brake is applied simultaneously with the vehicle's velocity being high. The actions shown in FIG. 3 that are taken by the CHMS LAMP CONTROL and MLD LAMP CONTROL blocks 48 and 54 of FIG. 2 can be modified in various ways without changing the intent of the invention.

While the invention has been particularly shown, described and illustrated in detail with reference to the preferred embodiments and modifications thereof, it should be understood by those skilled in the art that equivalent changes in form and detail may be made therein without departing from the true spirit and scope of the invention as claimed, except as precluded by the prior art.

The embodiments of the invention for which an exclusive privilege and property right is claimed are defined as follows:

1. A stoplamp modulator module electronic device for use in a vehicle to reduce rear-end collisions, the electronic device is adapted for attachment to and for lighting one or more lamps of a standard center high-mount stoplamp installed in the rear of the vehicle, the electronic device is also adapted for connection to a vehicle's speed pulser and brake light switch, the electronic device comprising:

a vehicle speed pulser interface and pulse counter connected to the vehicle's speed pulser for receiving and counting pulse inputs, the pulse inputs giving an indication of the vehicle's velocity;

compare logic means connected to said pulse counter for determining if the vehicle's velocity is above or below a predetermined velocity;

stoplamp control logic means connected to said compare logic means and the lamp of the stoplamp for controlling a complex periodic waveform to the lamp;

an oscillator and frequency counter connected to said compare logic means and said stoplamp control logic means for providing a selected complex periodic waveform to the lamp of the stoplamp; and light adjustment means connected to said oscillator and frequency counter and to said stoplamp control logic means for adjusting the complex periodic waveform to the lamp of the stoplamp, whereby a dimming, brightening, flickering or warble, and other light adjustments are made to the lamp when the vehicle's velocity is below the predetermined speed for warning trailing vehicles.

2. The electronic device as described in claim 1 wherein the predetermined velocity is in a range between 5 to 60 miles per hour.

3. The electronic device as described in claim 1 further including a brake interface connected to the brake light switch, said brake interface connected to said stoplamp control logic means.

4. The electronic device as described in claim 1 further including sample logic means connected to said compare logic means and said oscillator and frequency counter for periodically sampling the vehicle's velocity.

5. The electronic device as described in claim 4 wherein the periodic sampling occurs between a range of ½ to 2 seconds.

6. The electronic device as described in claim 1 further including reset logic means connected to said pulse counter and said oscillator and frequency counter for periodically resetting the pulse count by said pulse counter.

7. The electronic device as described in claim 6 wherein the periodic resetting of the pulse count occurs between a range of ½ to 2 seconds.

8. The electronic device as described in claim 1 further including circuitry and logic to power and modulate a moving light display having a plurality of lamps which is adapted for connection to said stoplamp control logic means, said moving light display designed to produce a variety of light patterns to supplement the control of the stoplamp when the vehicle is traveling above the predetermined velocity.

9. A stoplamp modulator module electronic device for use in a vehicle to reduce rear-end collisions, the electronic device is adapted for attachment to and for lighting one or more lamps of a standard center high-mount stoplamp installed in the rear of the vehicle, the electronic device is also adapted for connection to a vehicle's speed pulser and brake light switch, the electronic device comprising:

a vehicle speed pulser interface and pulse counter connected to the vehicle's speed pulser for receiving and counting pulse inputs from one or more different types of vehicles, the pulse inputs giving an indication of the vehicle's velocity;

compare logic means connected to said pulse counter for periodically determining if the vehicle's velocity is high or low depending on the previous velocity having been high or low, as well as on the comparison of the present velocity with low and high predetermined threshold velocities;

stoplamp control logic means connected to said compare logic means and the lamp of the stoplamp for controlling a complex periodic waveform to the lamp below the low predetermined threshold velocity;

an oscillator and frequency counter connected to said compare logic means and said stoplamp control logic means for providing a selected complex periodic waveform to the lamp of the stoplamp; and light adjustment means connected to said oscillator and frequency counter and to said stoplamp control logic means for adjusting the complex periodic waveform to the lamp of the stoplamp, whereby a dimming, brightening, flickering or warble, and other light adjustments are made to the lamp when the vehicle's velocity is interpreted as being low for warning trailing vehicles.

10. The electronic device as described in claim 9 wherein the first predetermined velocity is in a range between 5 to 60 miles per hour and the second predetermined velocity is in a range between one mile per hour larger up to 55 miles per hour larger than the first predetermined velocity.

11. The electronic device as described in claim 9 further including a brake interface connected to the brake light switch, said brake interface connected to said stoplamp control logic means for adjusting the complex periodic waveform to the lamp of the stoplamp when the vehicle's velocity is below the first predetermined velocity.

12. The electronic device as described in claim 9 further including sample logic means connected to said compare logic means and said oscillator and frequency counter for periodically sampling the vehicle's velocity every second.

13. The electronic device as described in claim 12 further including reset logic means connected to said pulse counter and said oscillator and frequency counter for periodically resetting the pulse count by said pulse counter every second and after each periodic sampling by said sample logic means.

14. The electronic device as described in claim 11 further including circuitry and logic to power and modulate a moving light display having a plurality of lamps which is adapted for connection to said stoplamp control logic means and said brake interface, said moving light display designed to produce a variety of light patterns to supplement the lamp of the stoplamp when the vehicle is traveling above the predetermined velocity when the brake light switch is actuated.

15. A stoplamp modulator module electronic device for use in a vehicle to reduce rear-end collisions, the electronic device is adapted for attachment to and for lighting one or more lamps of a standard center high-mount stoplamp installed in the rear of the vehicle, the electronic device is also adapted for connection to a vehicle's speed pulser and brake light switch, the electronic device comprising:

a vehicle speed pulser interface and pulse counter connected to the vehicle's speed pulser for receiving and counting pulse inputs, the pulse inputs giving an indication of the vehicle's velocity;

compare logic means connected to said pulse counter for determining if the vehicle's velocity is above a predetermined threshold velocity or is below a predetermined threshold velocity;

stoplamp control logic means connected to said compare logic means and the lamp of the stoplamp for controlling the complex periodic waveform to the lamp;

an oscillator and frequency counter connected to said compare logic means and said stoplamp control logic means for providing a selected complex periodic waveform to the lamp of the stoplamp;

a sample logic means connected to said compare logic means and said oscillator and frequency counter for periodically sampling the vehicles's velocity;

a one-bit latch connected to said sample logic means and said stoplamp control logic means, said one-bit latch storing information as to the vehicle travelling at a high or low velocity during a previous sample period by said sample logic means; and light adjustment means connected to said oscillator and frequency counter and to said stoplamp control logic means for adjusting the complex periodic waveform to the lamp of the stoplamp, whereby a dimming, brightening, flickering or warble, and other light adjustments are made to the lamp when the vehicle's velocity is below the predetermined velocity for warning trailing vehicles;

said compare logic means connected to said latch for periodically determining if the vehicle's previous velocity was high and its present velocity is below the lower predetermined threshold velocity, in which case the vehicle is considered to have changed to a low velocity, said compare logic means connected to said latch for periodically determining if the vehicle's previous velocity was low and its present velocity is above the higher predetermined threshold velocity, in which case the vehicle is considered to have changed to a high velocity.

16. The electronic device as described in claim 15 wherein the two predetermined threshold velocities are in a range between 5 to 60 miles per hour.

17. The electronic device as described in claim 15 wherein said pulse counter is a sticking counter, said pulse counter when reaching a certain count sticks to a count value until reset by reset logic means connected to said pulse counter and said oscillator and frequency counter, said reset logic means for periodically resetting the pulse count of said pulse counter.

18. The electronic device as described in claim 15 wherein a selected frequency from said oscillator and frequency counter is in a form of a complex periodic waveform created by logical combinations on one or more frequencies modulated from said frequency counter.

* * * * *